(12) United States Patent
Marchiano et al.

(10) Patent No.: US 6,804,344 B1
(45) Date of Patent: Oct. 12, 2004

(54) TELECOMMUNICATION NETWORK HAVING A VPN INTER-CONNECTION TO FOREIGN EXCHANGE SERVICE

(75) Inventors: Robert R. Marchiano, Westfield, NJ (US); Penn L. Pfautz, Middletown, NJ (US); Walter Paul Zahray, Matawan, NJ (US)

(73) Assignee: AT&T Corp., New York, NY (US)

( * ) Notice: Subject to any disclaimer, the term of this patent is extended or adjusted under 35 U.S.C. 154(b) by 450 days.

(21) Appl. No.: 09/925,133

(22) Filed: Aug. 9, 2001

(51) Int. Cl.[7] ............................................... H04M 7/00
(52) U.S. Cl. ................... 379/220.01; 379/219
(58) Field of Search .................... 379/219, 220.01, 379/207.01–207.16, 230, 289, 221.13, 221.14

(56) References Cited

U.S. PATENT DOCUMENTS

| | | | |
|---|---|---|---|
| 5,553,130 A | * | 9/1996 | Turner .................. 379/221.08 |
| 6,111,945 A | | 8/2000 | Goel et al. ................... 379/220 |
| 6,112,085 A | | 8/2000 | Garner et al. ............... 455/428 |
| 6,141,409 A | | 10/2000 | Madoch et al. ............. 379/207 |
| 6,205,216 B1 | | 3/2001 | Slater et al. ................. 379/229 |
| 6,445,785 B1 | * | 9/2002 | Chan et al. ............ 379/221.13 |

* cited by examiner

*Primary Examiner*—William J. Deane, Jr.

(57) ABSTRACT

A communication network includes a Virtual Private Network (VPN) interconnection to a Foreign Exchange (FX) service. A method for routing a call for a telecommunication network customer having Virtual Private Network (VPN) capability and Foreign Exchange (FX) lines, includes receiving a call destination number from a first customer location originating point having an origination location number. The method further includes routing the call to an FX line of the customer corresponding to the destination number through a virtual private network of the customer.

9 Claims, 3 Drawing Sheets

300 — TABLE 1 – COMMON FX ZONE TABLE

| DESTINATION NPA-NXX | FX ZONE |
|---|---|
| 732-242 (MATAWAN) | 10001 |
| 732-420 (MIDDLETOWN) | 10001 |
| 732-566 (MATAWAN) | 10001 |
| 732-410 (FREEHOLD) | 10002 |
| . . . | . . . |
| | |
| | |

301 — TABLE 2 – FX LINE TABLE FOR CUSTOMER N

| FX ZONE | FX NUMBER |
|---|---|
| 10001 | 732 242 1111 |
| 10002 | 732 677 1122 |
| . . . | . . . |
| | |
| | |

TELECOMMUNICATION NETWORK HAVING A VPN INTER-CONNECTION TO FOREIGN EXCHANGE SERVICE

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication networks and, more particularly, to network connection routing.

BACKGROUND OF THE INVENTION

It is well known in the art that toll calls are defined based upon the locations of the originating party and the destination party and the associated routing. Conventional networks typically offer so-called foreign exchange (FX) service to support remote local calling capabilities on a point-to-point basis, i.e., from a particular originating location to a particular destination area. Typically, a customer purchases FX service from a carrier on a per-circuit basis for access via dedicated circuit connections. For example, a customer can purchase an FX line for Matawan, N.J., and connect it to the private branch exchange (PBX) at the customer's Denver, Colo. location via a dedicated circuit from Denver to Matawan. With appropriate PBX programming, the customer can use this circuit to call from one originating location (Denver) to one destination area (Matawan N.J. area) as a local call.

However, this approach requires dedicated FX circuits between every combination of originating and terminating locations. Thus, increasing numbers of originating and terminating locations rapidly increase the number of dedicated circuits. For example, a customer with 50 originating locations desiring to remotely originate local calls to 100 different areas would require 5000 dedicated connections. This results in significant expense to the customer due to the costs of purchasing the dedicated circuits and purchasing corresponding PBX capacity for the dedicated circuits.

In addition, conventional networks require the customer to purchase a specific number of circuits in each dedicated connection. The number of simultaneous calls that can be supported between an originating location and a terminating area is limited to the number of circuits that are purchased. This arrangement forces trade-offs between the costs of purchasing additional circuits and the ability to support a desired level of peak traffic.

Further, such networks require the customer to maintain routing translations at each originating location that identify which dialed numbers are local calls from each FX line for routing eligible calls to the appropriate FX circuit. This routing data can be quite complex and can require frequent updates as Numbering Plan Areas (NPAs), e.g, area codes, are split and new NPAs are put in service.

It would, therefore, be desirable to provide a network that eliminates the need for maintaining routing translations, enables a customer to use an existing connection from each originating location, and eliminates a trade-off between purchasing additional circuits and supporting peak traffic levels.

SUMMARY OF THE INVENTION

The present invention provides a network having an interconnection between Virtual Private Networks (VPNs) and a Foreign Exchange (FX) service. With this arrangement, calls placed by a network customer at various customer locations can be provided to local exchange carriers as local calls that would traditionally be provided as toll calls. While the invention is primarily shown and described in conjunction with telephone networks, it is understood that the invention is generally applicable to networks in which it is desirable to reduce connection costs.

In one aspect of the invention, a network includes a plurality of switches/routers for routing connections from a plurality of customer locations to a plurality of destination areas. A predetermined set of FX lines, which can correspond to a set of rate centers, is assigned to each participating VPN customer of the network. Routing logic for each VPN customer is established to identify calls that can be re-originated as local calls on a particular FX line. Re-origination refers to the operation in which calls, e.g., traditional toll calls, are delivered from the network to a local exchange carrier as a local call. The network provides a virtual connection from the VPN customer to the corresponding set of FX lines.

BRIEF DESCRIPTION OF THE DRAWINGS

The invention will be more fully understood from the following detailed description taken in conjunction with the accompanying drawings, in which:

FIG. 3 is a tabular representation of FX number search tables for determining whether a customer has an FX number for a destination in accordance with the present invention.

DETAILED DESCRIPTION OF THE INVENTION

Figure 1:
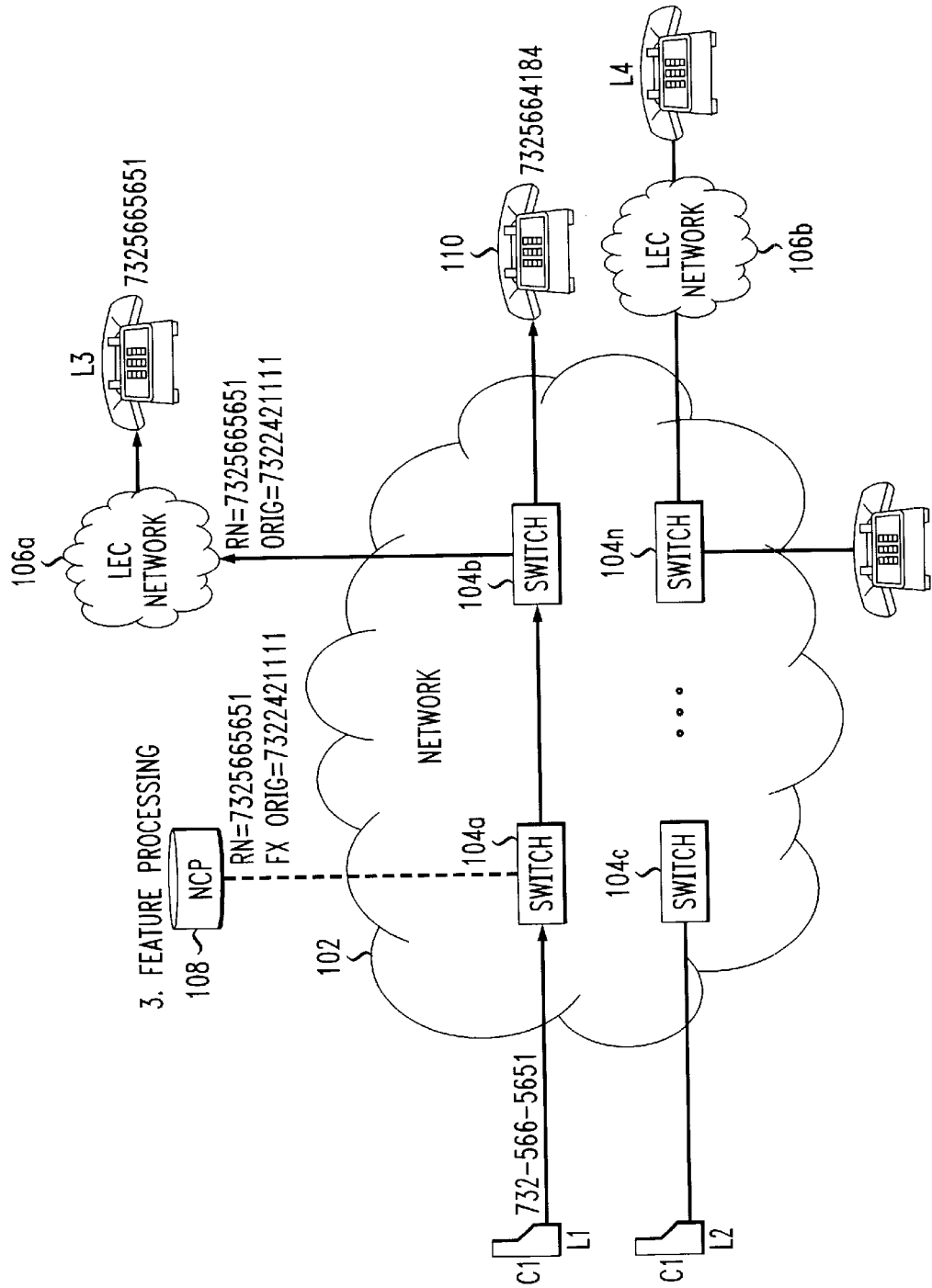
FIG. 1 is a schematic block diagram of a network having VPN-FX interconnection in accordance with the present invention.

FIG. 1 shows a telecommunication system 100 including a network 102 having Virtual Private Network (VPN) interconnection to a Foreign Exchange service in accordance with the present invention. As known to one of ordinary skill in the art, FX service refers to a capability generally offered by local telephone companies that provides a subscriber with a dedicated interconnection between an originating point and a terminating area. As used herein, VPN refers to a network capability, such as AT&T Software Defined Network (SDN), typically offered by toll carriers. One component of VPN service is the ability of the toll carrier to analyze the dialed number of calls originated by the VPN service customer, to identify eligible calls, and to route them using customer-specific dedicated facilities.

In general, a customer-specific set of FX lines, covering a strategic set of rate centers, will be assigned to each participating VPN customer. Routing logic is built for each participating VPN customer to identify calls that can be re-originated as local calls on a particular FX line. The switched network 102 provides a virtual interconnection from each participating VPN customer to the corresponding set of FX lines.

In the exemplary embodiment illustrated in FIG. 1, a first customer C1 has two distinct locations L1, L2 connected to the network 102, which can be an AT&T Network. The location L1, L2 connections can be nodal VPN service connections, such as AT&T SDN service. The network includes a plurality of switches 104a–N for routing calls from the first customer locations L1, L2 to destinations locations L3, L4 for example, via respective Local Exchange Carrier (LEC) networks 106a,b.

For example, the first customer C1 at a first location L1 may want to complete a call to a party at a specified location L3. The originating and destination locations L1, L3 are a sufficient distance apart that a conventional telephone call between them is classified as a toll call.

Customer equipment at the originating location L1 seizes a circuit and sends the destination number, e.g., 732-566-5651, to the serving switch 104a, which can be provided as an AT&T switch. At this point no distinction is made between calls that will receive VPN-FX processing and calls that will not. The serving switch 104a queries a service logic database (NCP) 108 with information including the dialed number and the calling location number. The NCP 108 performs traditional feature processing and, when applicable, also performs additional VPN-FX processing, described more fully below.

For a call from the originating location L1 (312 555 1234) to the destination location L3 (732 566 5651), VPN-FX routing applies (as discussed below) so that the NCP 108 response includes substitution of the appropriate customer FX originating number, e.g., 732 242 1111, for the originating location number, e.g., 315 555 1234, associated with the call. The originating number can be transported in the existing Calling Party Number ISUP field, for example. The NCP 108 response can also include local toll classification information, as described in U.S. Pat. No. 5,905,791, which is incorporated herein by reference.

The network 100 routes the call to the switch 104b serving the routing or dialed number, e.g., 732 566 5651. When the dialed number is served by a Local Exchange Carrier (LEC) not associated with the toll carrier, the terminating network switch 104b delivers the call to the appropriate LEC network 106a. The call is delivered as a local call, with the originating number indicating the FX number associated with the destination location L3 or a nearby local location. The LEC network 106a then delivers the call to the called party.

Alternatively, if the dialed number is served by the toll carrier, the final network switch 104b delivers the call directly to the called party 110.

It is understood that similar processing is also available for calls originated by the first customer C1 at the second location L2, and can apply to calls from either of these locations to either of the destination locations L3, L4.

In contrast, a typical prior art network providing equivalent FX capabilities would require either: 1) a total of four dedicated FX connections, from locations L1 to L3, L1 to L4, L2 to L3, and L2 to L4; or 2) two dedicated FX connections, one from locations L1 or L2 to location L3 and one from location L1 or L2 to location L4, plus a private network interconnecting locations L1 and L2. The growth of required dedicated connections in such a prior art arrangement will be readily apparent as the number of originating and terminating locations increases.

While the invention is shown as having two distinct customer locations accessing two destination areas, it will be readily apparent to one of ordinary skill in the art that the number of customer locations and the number of destination areas are virtually unlimited.

Figure 2:
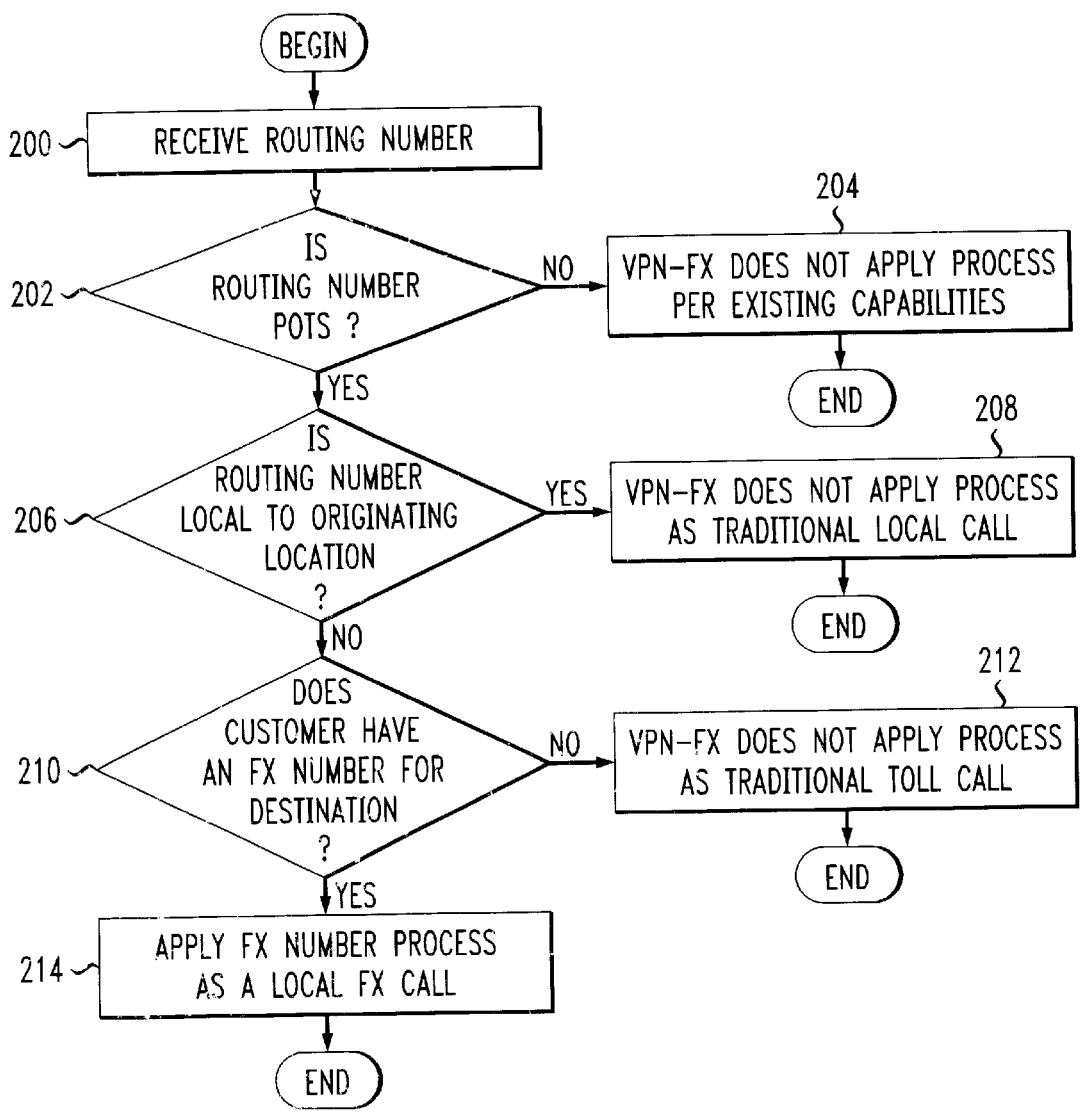
FIG. 2 is a flow diagram showing an exemplary sequence of steps for invoking VPN-FX processing in accordance with the present invention.

FIG. 2 shows an exemplary sequence of steps for applying VPN-FX service logic in accordance with the present invention. In step 200, the dialed or routing number is received by the network. In step 202, the network determines whether the routing number is plain old telephone service (POTS). If not, then in step 204 VPN-FX processing does not apply and the call is conventionally processed. If the routing number is POTS, then in step 206 it is determined whether the routing number is local to the originating location. If so, then VPN-FX processing does not apply and the call is handled as a traditional local call in step 208.

If the routing number was not local, then in step 210 it is determined whether the customer has an FX number for the called destination. If not, in step 212 the call is processed as a traditional toll call. If the customer does have an FX number for the destination, then the customer's FX number is applied and the call is processed as a local FX call in step 214 by using the customer VPN interconnection, as described above. In one embodiment, one or more tables can be searched to locate customer FX numbers, as described below.

FIG. 3 shows an exemplary implementation of FX number search tables 300, 301 that can be used to determined whether the customer has an FX number for the called destination, as described in step 210 of FIG. 2. In the illustrative embodiment, an FX Zone Table 300 is common to all customers. This table matches destination NPA-NXXs to an FX zone number. It is understood that NPA-NXXs from more than one rate center can be assigned the same FX Zone code. For example, Matawan and Middletown, N.J. are both assigned FX Zone 10001 since there is a common rate center (Matawan) from which calls to any rate center in the zone are local.

In an exemplary embodiment, an FX Line Table 302 exists for each customer. For each FX Zone, the unique line number assigned to the customer for FX service is listed. For example, customer N has FX number 732-242-1111 assigned for FX zone 1. A different customer has a different line number, e.g., 732-242-1112, assigned for this zone.

EXAMPLE

A customer has VPN, e.g., AT&T SDN, locations in Denver, Chicago, and multiple other cities. The customer is assigned a set of FX lines covering a strategic set of rate centers, which includes FX line 732-242-1111 associated with the Matawan N.J. rate center, and multiple other FX lines associated with other rate centers.

A VPN customer location in Denver originates a call to a residence customer served by a Local Exchange Carrier (LEC) in the Matawan N.J. rate center. In accordance with the invention, the customer's VPN feature logic recognizes that a call to Matawan, N.J. is local if originated from Matawan, N.J. and routes the call through the customer's Matawan, N.J. FX line. The network then delivers the call to the LEC in New Jersey as a local call originating from 732-242-1111, and pays a corresponding local settlement rate. This scenario also applies to calls to other rate centers in New Jersey (for example, Middletown, N.J.) that are close to Matawan and thus are a local call from Matawan. In contrast, prior art networks would deliver this call to the LEC in New Jersey as a toll call originating in Denver, and charge a corresponding toll access settlement rate.

The present invention provides a network in which VPN customer originating locations are interconnected to the customer's FX lines through the VPN. Re-originating traditional toll calls as local calls applies to calls originating from any of the VPN customer's many locations, and terminating to any of the many rate centers that can be reached as a local call from one of the customer's multiple FX lines.

It is understood that one of ordinary skill in the art will recognize that various modifications and substitutions can be made to the above-described exemplary embodiments without departing from the invention. For example, while a virtual private network, such as SDN provided by AT&T, is described, other types of suitable private networks can be used.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for routing a call for a telecommunication network customer having Virtual Private Network (VPN) capability and Foreign Exchange (FX) lines, comprising:

receiving a call destination number from a first one of a plurality of customer location originating points, each having an origination location number; and routing the call to an FX line of the customer corresponding to the destination number through a virtual private network of the customer.

2. The method according to claim 1, further including substituting an FX line number for the origination location number.

3. The method according to claim 1, further including delivering the call to a local exchange carrier as a local call.

4. The method according to claim 1, wherein the FX line corresponds to a call rate center.

5. A method of routing calls, comprising:

assigning a predetermined set of Foreign Exchange (FX) lines to a customer having a Virtual Private Network (VPN);

establishing routing logic for the VPN to identify calls that can be re-originated as local calls on a particular FX line in the set of FX lines, based upon a call destination number; and routing calls to the FX lines via the VPN.

6. The method according to claim 5, further including providing calls to a local exchange carrier as a local call.

7. The method according to claim 5, further including substituting an FX line number for an origination location number.

8. The method according to claim 5, further including interconnecting the set of FX lines to the VPN such that a plurality of customer locations can access the FX lines of the customer.

9. The method according to claim 5, further including querying a Service Logic (NCP) database to determine whether the customer has an FX line for a destination number.

* * * * *